United States Patent
Thillet et al.

(10) Patent No.: US 11,598,461 B2
(45) Date of Patent: Mar. 7, 2023

(54) FLUIDIC CONNECTION DEVICE FOR A FLUID CIRCUIT OF A MOTOR VEHICLE

(71) Applicant: HUTCHINSON, Paris (FR)

(72) Inventors: Antoine Thillet, Montargis (FR); Steeven Escure, Saint-Maurice-sur-Fessard (FR); Stéphane Ully, Chalette sur Loing (FR)

(73) Assignee: HUTCHINSON, Paris (FR)

( * ) Notice: Subject to any disclaimer, the term of this patent is extended or adjusted under 35 U.S.C. 154(b) by 668 days.

(21) Appl. No.: 16/586,312

(22) Filed: Sep. 27, 2019

(65) Prior Publication Data

US 2020/0103063 A1    Apr. 2, 2020

(30) Foreign Application Priority Data

Sep. 28, 2018 (FR) ..................................... 1858982

(51) Int. Cl.
*F16L 37/14* (2006.01)
*F16L 37/088* (2006.01)

(52) U.S. Cl.
CPC .......... *F16L 37/088* (2013.01); *F16L 37/144* (2013.01); *F16L 2201/10* (2013.01)

(58) Field of Classification Search
CPC ... F16L 37/088; F16L 37/0885; F16L 37/098; F16L 37/0985; F16L 37/12; F16L 37/1225; F16L 37/133; F16L 37/142; F16L 37/144; F16L 37/148; F16L 2201/10
USPC ..................................... 285/93, 81, 305, 308
See application file for complete search history.

(56) References Cited

U.S. PATENT DOCUMENTS 8,336,919 B2    12/2012  Gillet et al.

FOREIGN PATENT DOCUMENTS

| EP | 1582800 A1 * | 10/2005 | ............ F16L 37/088 |
|---|---|---|---|
| EP | 2722574 A1 | 4/2014 | |
| EP | 2988048 A1 | 2/2016 | |
| EP | 3339709 A1 | 6/2018 | |
| FR | 2 795 156 A1 | 12/2000 | |
| FR | 2 945 100 A1 | 11/2010 | |

OTHER PUBLICATIONS

Preliminary Research Report dated Apr. 26, 2019, issued in corresponding French Application No. 1858982, filed on Sep. 28, 2018, 2 pages.

* cited by examiner

*Primary Examiner* — Aaron M Dunwoody
(74) *Attorney, Agent, or Firm* — Christensen O'Connor Johnson Kindness PLLC

(57) ABSTRACT

A fluidic connection device for a fluid circuit of a motor vehicle includes a female fluidic connector, a U-shaped lock, and a locking indicator. The female fluidic connector includes a housing configured to receive a male fluidic connector, by translation along an axis (A). The U-shaped lock is carried by the female connector and includes a pair of elastically deformable legs that arranged substantially in a first plane, perpendicular to the axis (A) and on either side of the axis (A) and being configured to cooperate by elastic snap-fitting with the male connector to ensure retention of the male connector in the female connector along the axis (A). The locking indicator is carried by the female connector and configured to be translated in a second plane, perpendicular to the axis (A), between a first position for releasing the locking indicator and a second position for locking the locking indicator.

17 Claims, 8 Drawing Sheets

Fig. 5
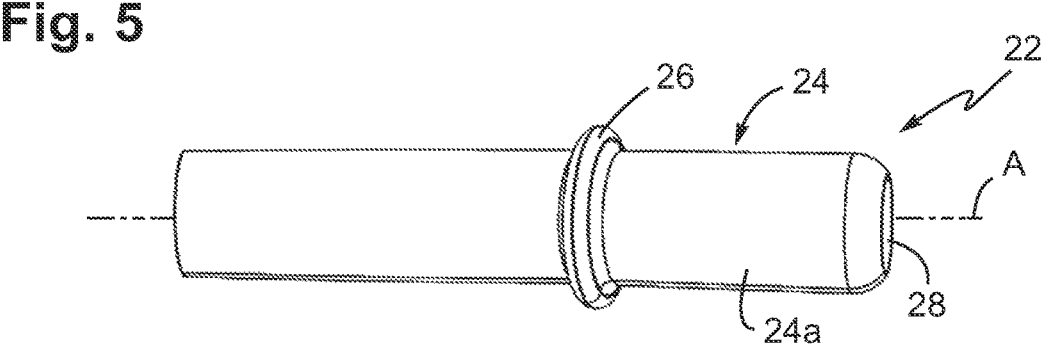
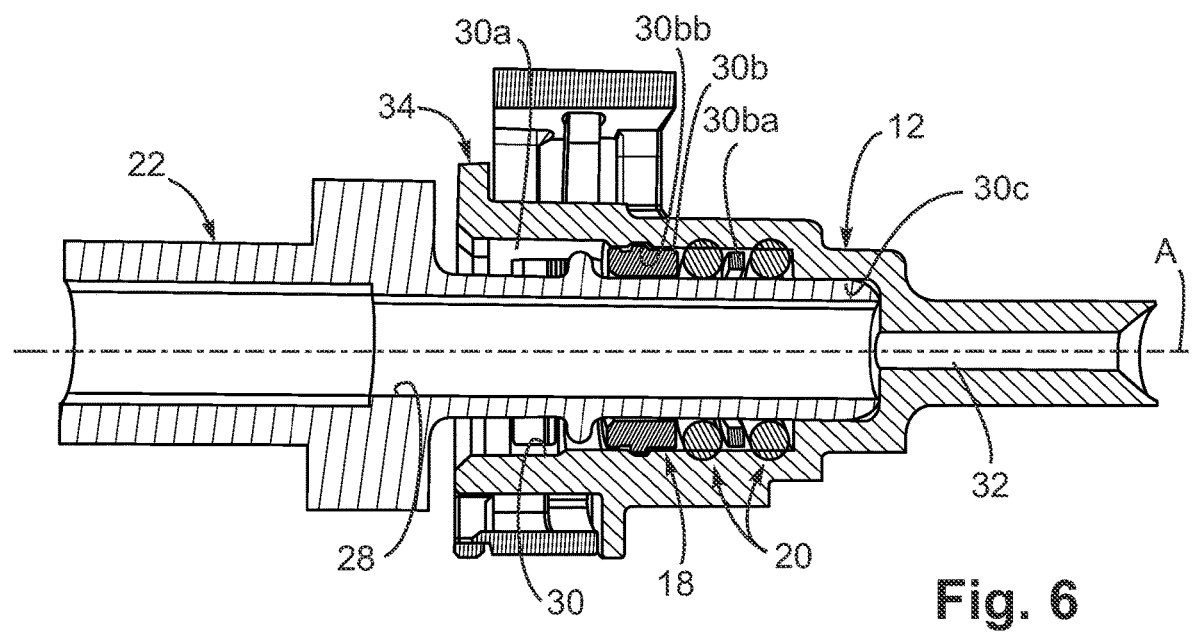
Fig. 6
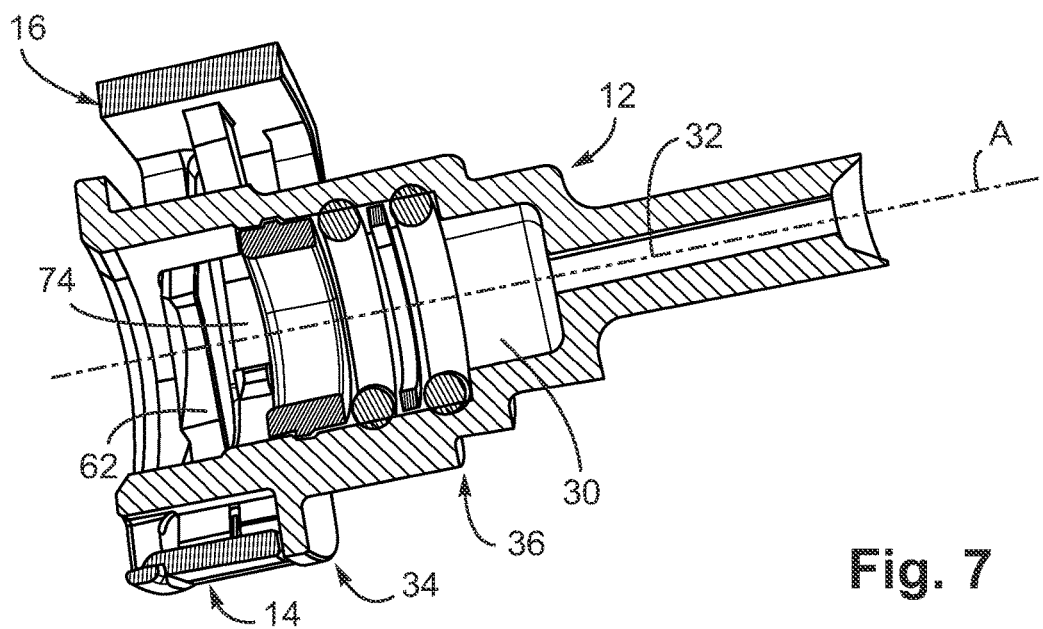
Fig. 7

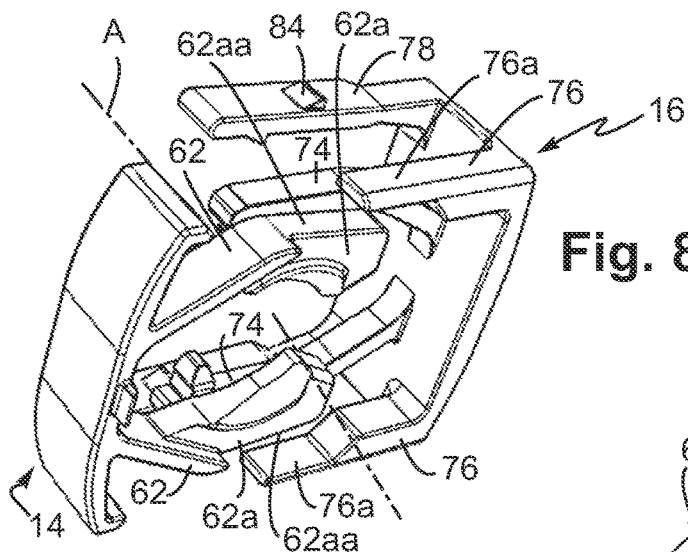
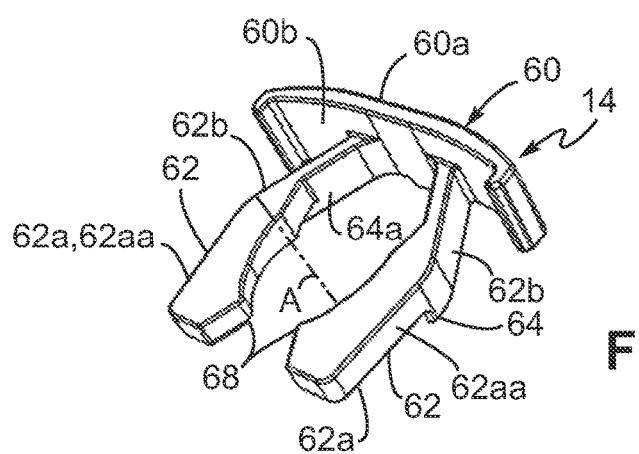
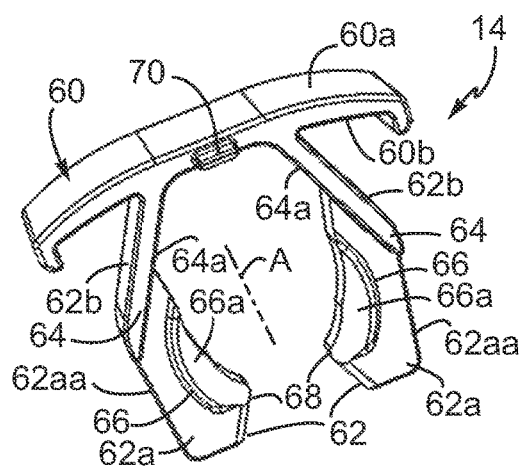
Fig. 8
Fig. 9
Fig. 10
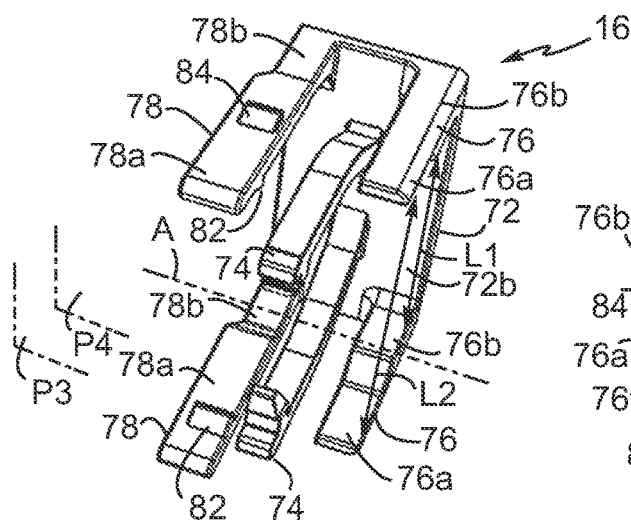
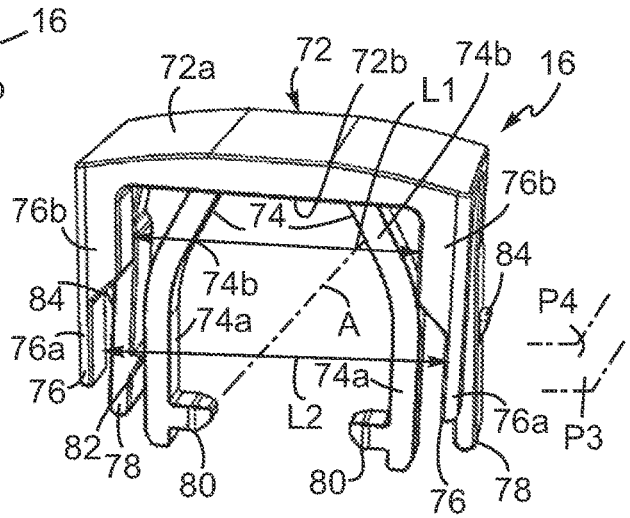
Fig. 11
Fig. 12

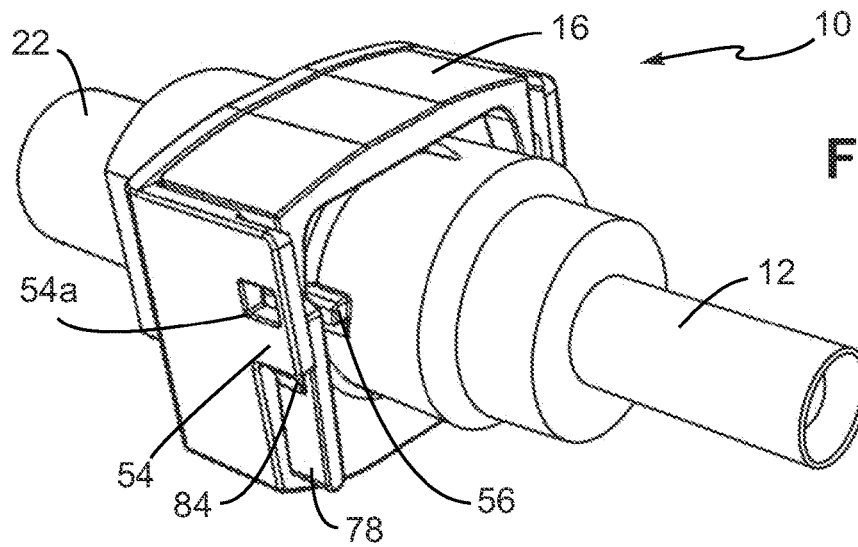
Fig. 19
Fig. 20
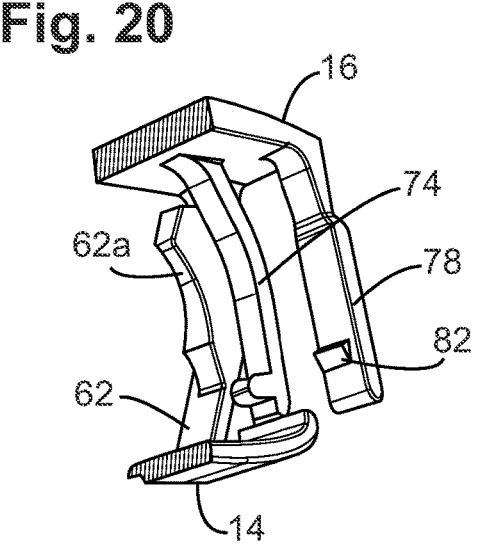
Fig. 21
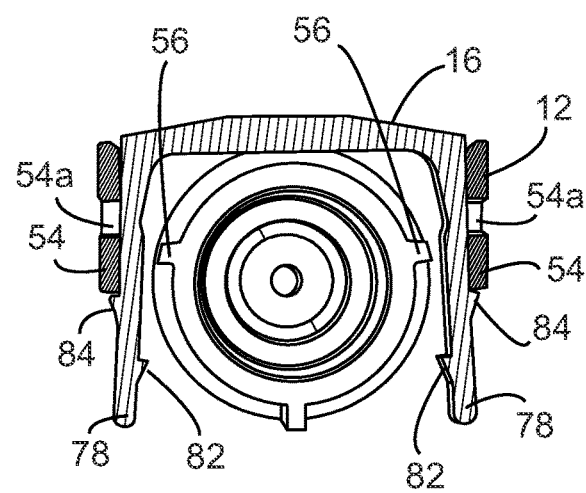
Fig. 22
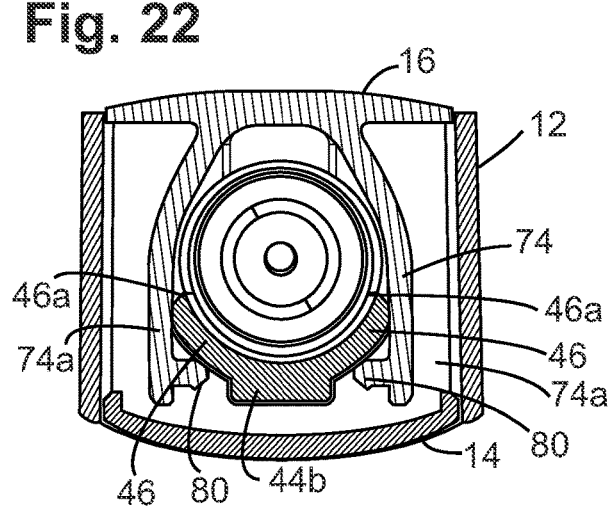
Fig. 23
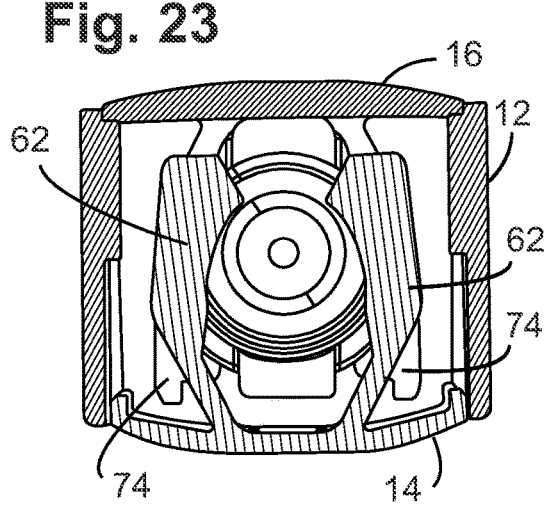

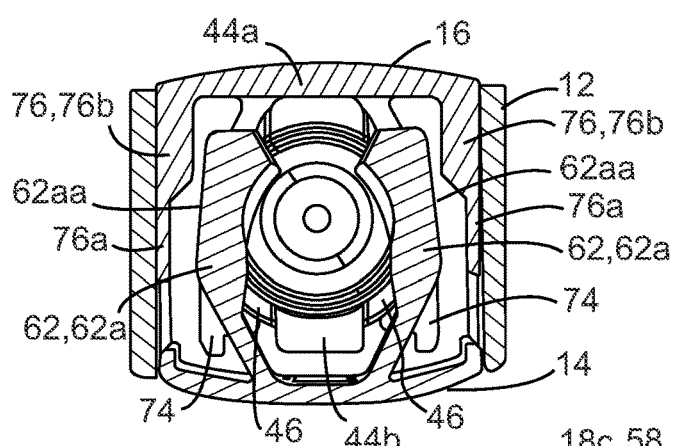
Fig. 24
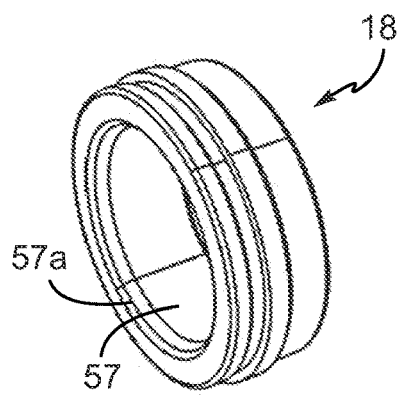
Fig. 25
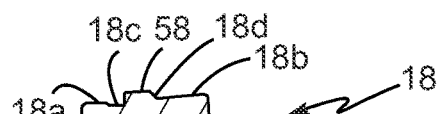
Fig. 26
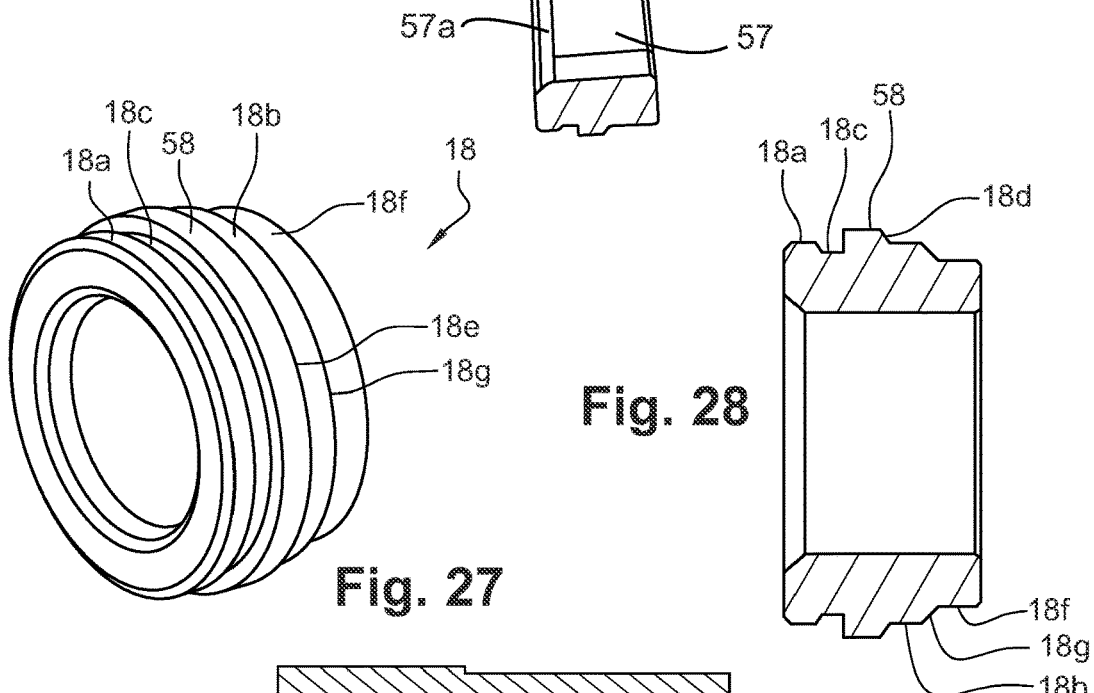
Fig. 27
Fig. 28
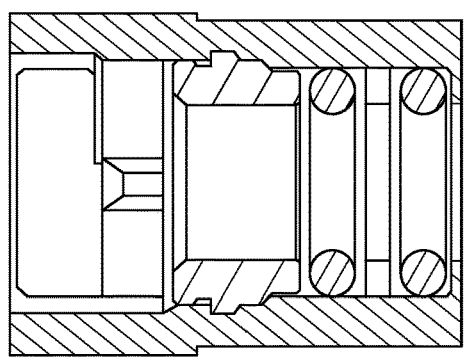
Fig. 29

FLUIDIC CONNECTION DEVICE FOR A FLUID CIRCUIT OF A MOTOR VEHICLE

CROSS REFERENCE TO RELATED APPLICATION

This application claims priority under 35 U.S.C. § 119 to French Patent Application No. 1858982, filed Sep. 28, 2018, the entirety of which is hereby incorporated by reference.

TECHNICAL FIELD

The present disclosure relates to a fluidic connection device, for example a fluid circuit of a motor vehicle. Such a device can be used in a fuel supply circuit, a depollution circuit, a brake assistance circuit, etc. of a vehicle.

BACKGROUND

The state of the art includes French Patent Publication Nos. FR-A1-2,795,156 and FR-A1-2,945,100, both to Hutchinson.

This document describes a fluidic connection device equipped with a visual indicator of good connection between two connectors, respectively male and female.

This type of device comprises:
- a female fluidic connector comprising a housing for inserting a male fluidic connector, by translation along an axis A,
- a generally U-shaped lock carried by the female connector and comprising a pair of elastically deformable legs, these legs being arranged substantially in a first plane perpendicular to the axis A and on either side of the axis and being configured to cooperate by elastic snap-fitting with the male connector so as to ensure retention of the male connector in the female connector along the axis A, and
- a locking indicator carried by the female connector and configured to be moved in translation in a second plane perpendicular to the axis A.

The male connector generally comprises an outer annular ridge and the legs of the lock cooperate by elastic snap-fitting with this ridge during the insertion of the male connector in the housing of the female connector. During this insertion, the ridge of the male connector bears onto the front of the legs and displaces them from one another by elastic deformation. The insertion of the male connector is continued until the ridge is positioned behind the legs. By elastic return, the legs return to a position, less or not constrained, wherein they extend behind the ridge and block a removal of the male connector from the female connector by translation along the axis A.

When the male connector is not engaged in the female connector, the indicator cooperates with the female connector so as to not be able to be moved with respect to the female connector. If the male connector is engaged in the female connector, but not sufficiently or not correctly positioned in the female connector, the indicator cannot however be moved with respect to the female connector. When the male connector is correctly positioned in the female connector, this movement is enabled. This correct position is defined in the above-mentioned example as being the fact that the ridge of the male connector is located behind the legs of the lock, and therefore that the legs of the lock had correctly cooperated by elastic snap-fitting with the ridge and had returned to their free retaining position of the male connector. In this position, the ridge of the male connector cooperates with the indicator to enable its movement with respect to the female connector. The indicator can thus be moved with respect to the female connector from the initial position, for example for releasing the lock, wherein the lock can therefore be moved, up to a second position, for example, locking the lock, wherein the lock and therefore the male connector are blocked. This second position of the indicator therefore ensures, on the one hand, the correct positioning of the male connector in the form of a "visual indicator," even the blocking of the lock in its retaining position of the male connector.

In the current art, the functions of the indicator are generally ensured by a pair of legs, whose elastic deformation capacity by displacement is determined to best respond to these functions. However, the compromise can be made at the expense of some of these functions.

The present disclosure proposes an improvement of this technology.

SUMMARY

In an aspect, a fluidic connection device, for example a fluid circuit of a motor vehicle, comprises a female fluidic connector, a U-shaped lock, and a locking indicator.

The female fluidic connector comprises a housing for inserting a male fluidic connector, by translation along an axis A.

The generally U-shaped lock carried by the female connector comprises a pair of elastically deformable legs, these legs being arranged substantially in a first plane perpendicular to the axis A on either side of the axis and being configured to cooperate by elastic snap-fitting with the male connector so as to ensure a retaining of the male connector in the female connector along the axis A.

The locking indicator carried by the female connector is configured to be moved in translation in a second plane perpendicular to the axis A, between a first position for releasing the lock and a second position for locking the lock.

The indicator comprises at least one first pair of legs and a second pair of legs, the legs of the first pair being separated from the legs of the second pair and the legs of the first pair having an elastic deformation capacity by displacement of one from the other, which is different from the same capacity of the second pair.

The first pair of legs are configured to cooperate by elastic deformation with the male connector, from a first position, substantially free without constraint, wherein these legs cooperate with the female connector to prevent a translation of the indicator in the second plane towards the axis A, up to a constrained position wherein the indicator is configured to be moved in translation in the second plane.

The second pair of legs are configured to cooperate by abutment with the legs of the lock to limit their displacement, when the indicator is in its second position.

The present disclosure thus proposes to make independent the legs of the indicator. The legs of the first pair cooperate at least with the male and female connectors, and the legs of the second pair cooperate at least with the legs of the lock. The independence of the legs makes it possible to adjust their elastic deformation capacity independently from one another and therefore to adapt this capacity to the function sought.

The legs of the first pair have, for example, a resistance to the displacement from one another comprised between 1N and 100N, for example between 10N and 50N, and between 15N and 30N. The legs have, for example, a maximum displacement capacity under load comprised between 5 mm and 10 mm.

The legs of the second pair have, for example, a resistance to the displacement between 100N and 500N, for example between 150N and 400N, and between 200N and 300N. The legs have, for example, a maximum displacement capacity under load comprised between 1 mm and 5 mm.

A machine suitable to measure the resistance to the displacement from one another is, for example, a Tinius Olsen H25KT dynamometer.

The device can comprise one or more of the following features taken individually from one another or in combination with one another:

In an embodiment, the indicator comprises a third pair of legs which are separated from the legs of the first and second pairs and which have an elastic deformation capacity by displacement from one another, which is different from the same capacity of the first and/or of the second pair(s), the third pair of legs being configured to cooperate by elastic snap-fitting with the female connector to retain the indicator opposite the female connector in translation in the second plane.

In an embodiment, the legs of the third pair have, for example, a resistance to the displacement comprised between 1N and 100N, for example between 10N and 50N, and between 15N and 30N; they have, for example, a maximum displacement capacity under load comprised between 5 mm and 10 mm.

In an embodiment, the legs of the third pair comprise hooks oriented inwards with respect to the axis A, and hooks oriented outwards with respect to the axis A.

In an embodiment, the female connector comprises a connection interface comprising the housing and connected to a connecting line extending from one side of the interface along the axis A, the connecting line comprising a cylindrical portion comprising first fastening members oriented outwards with respect to the axis A and configured to cooperate with the inner hooks, and the interface comprising two legs facing the first members and comprising second fastening members configured to cooperate with the outer hooks.

In an embodiment, the first members are located in a third plane, parallel to the axis A, and the second members are located in a fourth plane, parallel to the third plane and further away from the axis A than it is from the third plane.

In an embodiment, the legs of the third pair are configured to each undergo a double flexion, respectively inwards and outwards with respect to the axis A, during the passage of the indicator between its first position and its second position, and conversely; this "chicane" effect makes it possible to guarantee the unlosable character of the indicator opposite the female connector.

In an embodiment, the pairs of legs extend in planes parallel to and offset from one another.

In an embodiment, the plane of the first pair of legs is located between the planes of the second and third pairs of legs.

In an embodiment, the legs of the third pair are aligned axially with the legs of the second pair.

In an embodiment, the pairs of legs are connected to a closing cap of a cavity of the female connector.

In an embodiment, the legs of the second pair comprise first free portions displaced from one another by a distance L2 and connected to the cap by second portions displaced from one another by a distance L1 which is less than L2, the legs of the lock being configured to be opposite the first portions when the indicator is in its first position, and to be opposite the second positions when the indicator is in its second position; the second portions of the legs of the indicator are thus configured to prevent, by abutment, a displacement one from another of the legs from the lock, which is sufficient to release the male connector from the female connector.

In an embodiment, the legs of the second pair are configured to each be sandwiched between one of the legs of the lock and a side wall of the female connector.

In an embodiment, the cap has a generally flat and parallelepiped shape, and the legs of the second and third pairs are connected respectively to the four corners of one of the faces of the cap.

In an embodiment, the legs of the first pair are connected substantially in the middle of the face of the cap.

In an embodiment, the female connector comprises a wall comprising a passage opening of the male connector, the legs of the lock configured to bear onto an excess thickness of this wall which forms, for example, an annular boss around the opening; the female connector is thus reinforced and best resists the pull-out of the male connector with respect to the female connector.

In an embodiment, the lock comprises a protruding lug configured to be engaged by force or by elastic deformation in an orifice of the female connector.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The present disclosure will be best understood and other details, features and advantages will appear more clearly upon reading the following description made as a non-limiting example and in reference to the appended drawings, wherein:

FIG. 5 is a schematic, perspective view of a male connector of the device of FIG. 1, FIGS. 6 and 7 are schematic, perspective, axial cross-sectional view of the device of FIG. 1, the male connector being absent in FIG. 7, FIG. 8 is a schematic, perspective view of a lock and of an indicator of the device of FIG. 1, FIGS. 9 and 10 are schematic, perspective views of the lock of FIG. 8, FIGS. 11 and 12 are schematic, perspective views of the indicator of FIG. 8, FIGS. 13 to 24 are schematic, perspective and/or cross-sectional views of the device of FIG. 1, the indicator being in a first position in FIGS. 15-18 and in a second position in FIGS. 13, 14 and 19-24, FIGS. 25 and 26 are schematic, respectively perspective and cross-sectional views of a centring and/or locking ring, of the device of FIG. 1, FIGS. 27 and 28 are schematic, respectively perspective and cross-sectional views of an embodiment variant of the centring and/or locking rings, of the device, FIG. 29 is a schematic, axial cross-sectional view of a fluidic connection device, wherein is mounted the ring of FIGS. 27 and 28, FIGS. 30 and 31 are schematic, cross-sectional view of the device of FIG. 1 and illustrate a step of elastic snap-fitting the male connector in the female connector.

DETAILED DESCRIPTION

Figure 1:
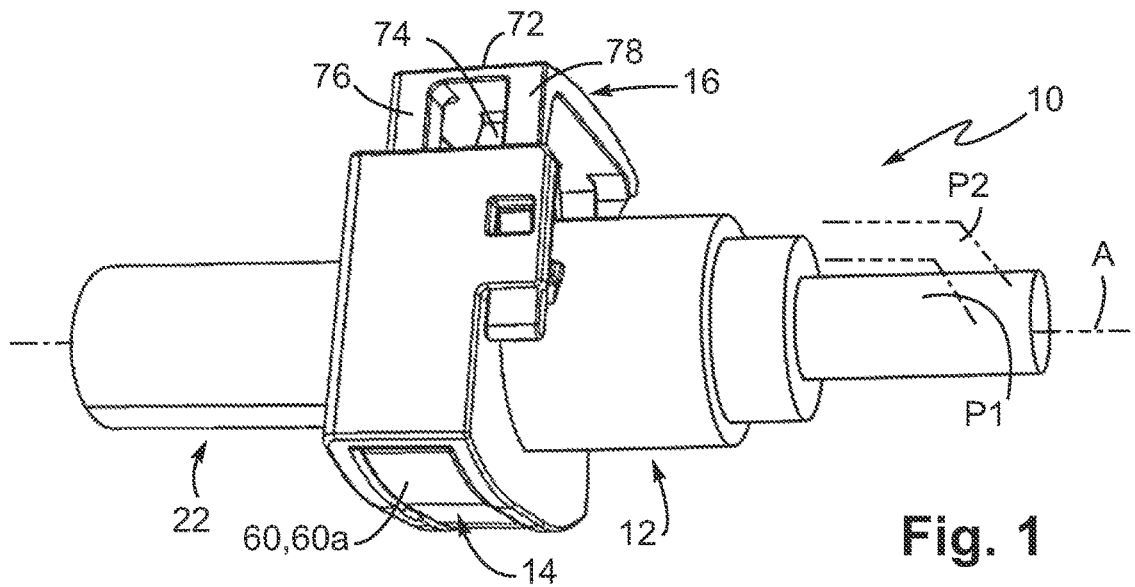
FIG. 1 is a schematic, perspective view of a fluidic connection device according to one embodiment of the present disclosure.

FIGS. 1 to 26 illustrate an embodiment of a device 10 configured for fluidic connection, for example for a fuel supply circuit, a brake assistance circuit of a combustion engine vehicle, an SCR (Selective Catalytic Reduction) depollution circuit, etc.

The device 10 comprises three elements, namely a female connector 12, a lock 14 and a locking indicator 16. The female connector 12 is represented alone in FIG. 2 to FIG. 4. The lock 14 is represented alone in FIG. 9 and FIG. 10, and the indicator 16 is represented alone in FIG. 11 and FIG. 12. In the example represented, the device 10 comprises other elements such as a centring ring 18 and gaskets 20 which will be described later, below.

The device 10 is in addition configured to cooperate with a male connector 22 which is illustrated in FIG. 5. This male connector 22 comprises a cylindrical nozzle 24 comprising an outer annular ridge 26. The ridge 26 is located at a predetermined axial distance from the free end of the nozzle 24 and the outer cylindrical surface of the nozzle which extends between the ridge 26 and this free end is referenced 24a. The free end of the nozzle 24 is bevelled or rounded, like in the example represented, to facilitate its insertion in the female connector 12. Moreover, the male connector 22 comprises an inner axial bore 28 for circulation of fluid.

Figure 2:
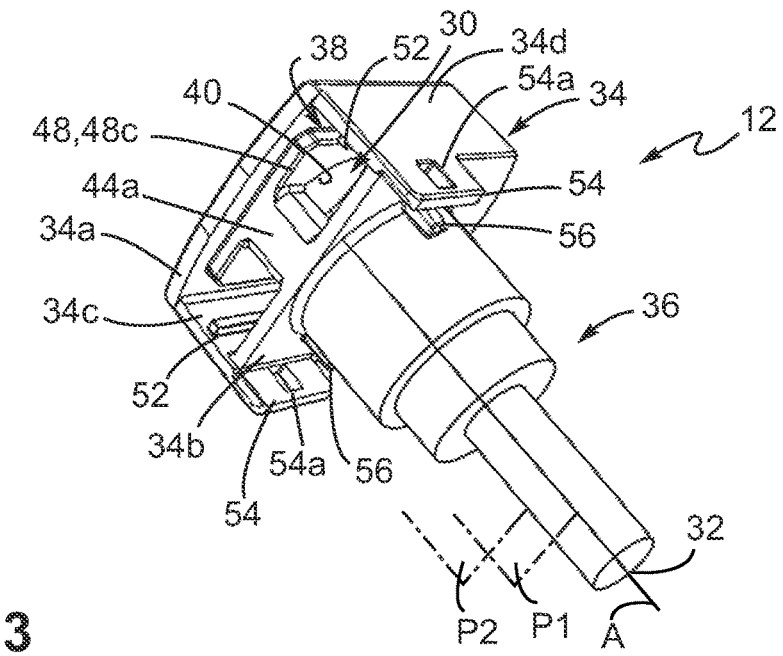
FIGS. 2 to 4 are schematic, perspective, cross-sectional views of a female connector of the device of FIG. 1.
Figure 3:
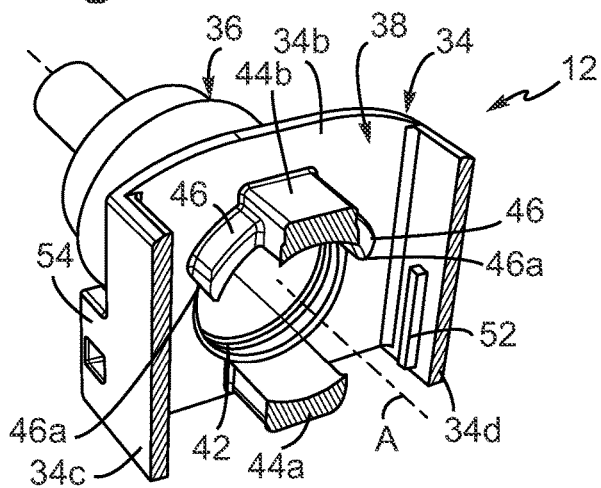
Figure 4:
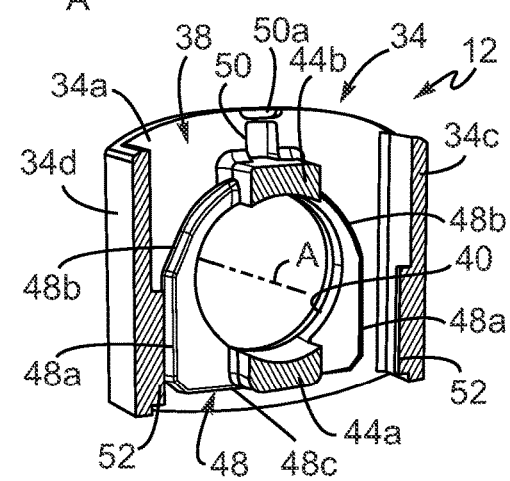

The female connector 12, which can be seen for example in FIG. 2 to FIG. 4, comprises an inner housing 30 for receiving the male connector 22 and for example, the nozzle 24 of this connector, this housing 30 being in fluidic communication with an inner bore 32 for circulation of fluid. The housing 30 has an axis A.

In the present application, the expressions "inner" and "outer", or "internal" and "external" are assessed with respect to this axis A. Inner or internal elements are oriented towards the axis A while the outer or external elements are oriented from the side opposite the axis A. Other expressions "front", "behind", "side", "upper" and "lower" are used to better understand the positionings of different elements, without these indications being limiting on the positioning of the device during use or in a mounting position on a vehicle, for example.

Figure 34:
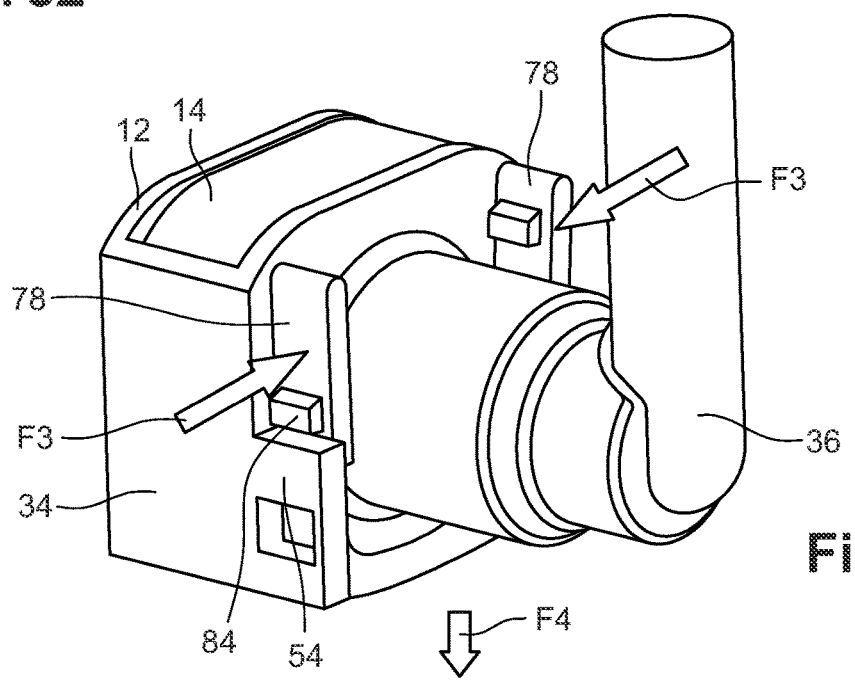
FIG. 34 is a schematic, perspective view of a device and illustrates a step of unlocking the indicator before its movement from its second to its first position.

The female connector 12 comprises a connection interface 34, wherein is formed at least one portion of the housing 30, and a connecting line 36, wherein is formed the bore 32. The interface 34 here has a general parallelepiped shape and the line 36 has a general cylindrical shape which can be straight (FIGS. 1, 2, and 6) or bent (FIG. 34).

The free end of the line 36, opposite the interface 34, on the one hand, and the end of the male connector 22 opposite the nozzle 24, on the other hand, are configured to be connected to members to be connected, such as two pipes of a fluidic circuit, for example.

The interface 34 carries the lock 14 and the indicator 16. The interface 34 comprises an inner cavity 38, wherein are at least partially mounted, the lock 14 and the indicator 16.

The interface 34 comprises two parallel walls, respectively front and rear 34a, 34b, and two parallel side walls 34c, 34d, these walls defining together the cavity 38 which is open at its upper end for mounting the indicator 16, and at its lower end for the mounting of the lock 14.

The walls 34a, 34b are passed through by the housing 30 and comprise central openings 40, 42 aligned on the axis A. In addition to being connected by the walls 34c, 34d, the walls 34a, 34b are connected together by two material bridges located in the cavity 38, respectively upper 44a, and lower 44b. The bridges 44a, 44b are diametrically opposite with respect to the axis A. In the illustrated embodiment, they are located as close as possible to the openings 40, 42.

The rear wall 34b comprises, on its front face, which is located in the cavity 38, two side vanes 46 which are formed protruding and extend on either side of the lower bridge 44b by extending the portions of the peripheral edge of the opening 42 (FIG. 3). Each vane 46 has an angular extent of around 20-30° in the example represented and comprises a circumferential end connected to a side of the bridge 44b, and an opposite circumferential end 46a which is oriented substantially upwards.

The front wall 34a comprises, on its rear face, which is located in the cavity 38, a protruding boss 48 which extends around the opening 40 (FIG. 4). The boss 48 comprises two straight, outer side edges 48a parallel to one another and to the walls 34c, 34d and two inclined lower edges 48b connecting the lower ends of the straight edges 48a to the sides of the lower bridge 44b. The upper ends of the straight edges 48a are connected together by a straight upper edge 48c, substantially perpendicular to the edges 48a.

The front wall 34a further comprises a through orifice 50 located between the lower bridge 44b and the lower edge of this wall 34a.

Each of the walls 34c, 34d comprises a rectilinear ridge 52 on its face located in the cavity 38. The ridges 52 extend parallel to the walls 34a, 34b, to the middle of the walls 34c, 34d in the axial direction, and from the upper edge of each of these walls up to substantially half of the height of these walls.

These walls 34c, 34d extend axially rearwards to form two side legs 54, which extend parallel at a distance from a cylindrical section of the line 36. The legs 54 each comprise a through orifice 54a forming a fastening member. The section of the line 36 further comprises, facing these legs 54, protruding blocks 56 also forming fastening members.

As can be seen in FIG. 2, the blocks 56 are located in a first plane P1 parallel to the axis A and the orifices 54a are located in a second plane P2 parallel to the axis A and to the first plane P1. The plane P2 is further away from the axis A that it is from the plane P1.

The housing 30, better visible in FIGS. 6 and 7, comprises three portions 30a, 30b, 30c. The portion 30a extends substantially in the interface 34 and has the greatest diameter. The portions 30b, 30c extend coaxially in the line 36, the intermediate portion 30b having a diameter less than that of the portion 30a and greater than that of the portion 30c. The diameter of the portion 30c is slightly greater than that of the nozzle 24 of the male connector 22 and cooperates by sliding with its surface 24a.

A ring 18 and two annular gaskets 20 are housed in the portion 30b and are configured to be passed through by the nozzle 24 of the male connector 22. The ring 18 can have a centring function by engaging with the nozzle 24 of the male connector 22, and/or locking or abutting by engaging with the seals 20. The seals 20 are configured to be radially compressed between the surface 24a of the nozzle 24 and the inner cylindrical surface of the portion 30b and can be separated axially from one another by an inner annular edge 30ba of this portion 30b or a spacer returned in this portion 30b. The edge 30ba or the spacer forms a seal 20 separator.

The seals 20 are located between the ring 18 and the portion 30c, this ring 18 being best seen in FIGS. 25 and 26. The ring 18 is used to abut the seals 20. This ring comprises an inner cylindrical surface 57 of which one front axial end 57a is flared to facilitate the insertion and the centring of the male connector 22, this end being configured to cooperate with the abovementioned free end of the nozzle 24. The ring 18 comprises an outer periphery which is shaped to be interlocked by force in a section of complementary shape of the portion 30b.

In the example represented, the ring 18 comprises an outer annular edge 58 which cooperates by interlocking with an inner annular ridge 30bb of the portion 30b. The ring 18 comprises two outer cylindrical surfaces, substantially of the same diameter, respectively front 18a and rear 18b. The surface 18a is connected to the edge 58 by a cylindrical ridge 18c (of a smaller diameter than the surface 18a) and the surface 18b is connected to the edge by a truncated surface 18d.

The section of the portion 30b, which comprises the ridge 30bb, has a shape complementary to these different surfaces 18a-18d (FIG. 6).

The edge 58 cooperates with the ridge 30bb to axially lock the ring 18 in the housing 30 of the female connector 12. This locking is useful to guarantee the positioning of the ring 18 and therefore seals 20 due to the temperature and pressure variations of the fluid transferred by the device when functioning.

FIGS. 27 to 29 represent an embodiment variant of the ring 18 which comprises, in addition to the features of the ring of FIGS. 25 and 26, a rear extension comprising an outer cylindrical surface 18f of which the diameter is less than that of the surfaces 18a, 18b. The surface 18f can be connected to the surface 18b by another truncated surface 18g.

The section of the portion 30b, configured to receive the ring 18 of FIGS. 27 and 28, thus has a more complex shape complementary to the surfaces 18a-18f (FIG. 29). This variant makes it possible, for example, to avoid an incorrect mounting of the ring 18 in the housing 30 of the female connector, due to, for example, the surface 18f of a smaller diameter which has a fool-proofing function.

Now, the lock 14 represented in FIGS. 9 and 10 will be described.

The lock 14 comprises a cap 60 and two elastically deformable legs 62. The cap 60 is configured to close the lower end of the cavity 38 and therefore here has a parallelepiped shape, which is designed to close this cavity here by being inserted between the lower edges of the walls 34a-34d.

The lock 14 has a symmetry with respect to a median plane which passes to the middle of the cap 60 and between the legs 62. When the lock is mounted on the female connector 12, it extends in a plane substantially perpendicular to the axis A, this axis A passing substantially between the legs 62.

The cap 60 has a visible lower face 60a and an upper face 60b connected to the legs 62. The legs 62 each have a general V-shape and comprise first branches 62a, of which the outer edges 62aa are parallel or inclined, and second branches 66b which are inclined at around 40-80° to one another and connect the first branches 62a to the cap 60.

Each of the branches 66b comprises a ridge 64 which extends over the length of this protruding branch frontwards. These ridges 64 comprise longitudinal edges 64a oriented towards the axis A.

Each of the branches 62a comprises, on its front face, a boss 66 with a circumferential orientation around the axis A. This boss 66 features a concave, curved surface 66a configured to cooperate with the ridge 26 of the male connector 22 during the insertion of the latter into the female connector 12. The branches 62a each carry, at its upper ends, opposite the cap 60, two teeth 68 or ends which are oriented towards one another. In the example represented, the distance between the teeth 68 represents the smallest distance between the branches 62a.

The cap 60 moreover comprises, on its front longitudinal edge, a protruding lug 70.

Now, the indicator 16 represented in FIGS. 11 and 12 will be described.

The indicator 16 comprises a cap 72 and three independent pairs of legs 74, 76, 78. The cap 72 is configured to close the upper end of the cavity 38 and therefore here has a parallelepiped shape, which is designed to close this cavity here, by being inserted between the upper edges of the walls 34a-34d and/or by bearing onto some of these edges.

The indicator 16 has a symmetry with respect to a median plane which passes to the middle of the cap 72 and between the legs 74-78. When the indicator is mounted on the female connector 12, it extends into a plane, substantially perpendicular to the axis A, this axis A passing substantially between the legs 74-78.

The cap 72 has a visible upper face 72a and a lower face 76b connected to the legs 74-78.

The legs 74 each have a general V-shape and comprise first substantially parallel branches 74a, and second branches 74b which are inclined at around 40-80° to one another and connect the first branches 74a to the cap 72.

Each of the branches 74b has a generally rectilinear shape and extends substantially from the middle of the face 76b up to a branch 74a.

Each of the branches 74a has a generally rectilinear shape and comprises, at its lower end, opposite the cap 72, a tooth 80. The teeth 80 of the legs 74 are oriented towards one another, the distance between the teeth 80 representing the smallest distance between the branches 74a.

The other legs 76 and 78 are located at the four corners of the face 76b of the cap 72, the legs 76 being located on the front corners and the legs 78 being located on the rear corners.

The legs 76 are rectilinear and extend substantially perpendicularly to the cap 72. They each comprise two portions, namely a lower portion 76a and an upper portion of excess thickness 76b which connects the portion 76a to the cap 72. The thickness of the legs 76 here is measured in a plane, perpendicular to the axis A, between the outer and inner edges of the portions 76a, 76b. The distance L1 between the portions 76b is less than the distance L2 between the portions 76a.

The legs 78 are rectilinear and extend substantially perpendicularly to the cap 72. They each comprise two portions, namely an expanded lower portion 78a and an upper portion 78b which connects the portion 78a to the cap 72. The width of the legs 78 here is measured in a plane parallel to the axis A and passing through a side edge of the cap 72.

The portions 78a of the legs 78 comprise two inner teeth 82, i.e. oriented towards the axis A, and two outer teeth 84.

The teeth 82 are located in a plane P3 parallel to the axis A and to the cap 72, and the teeth 84 are located in a plane P4 parallel to the plane P3 and located between the plane P3 and the cap 72.

The portions 78a form members for gripping the legs 78 and therefore the indicator 16.

FIG. 1 shows the mounting position, substantially free and without constraint, of the lock 14 on the female connector 12. It is observed that the cap 60 of the lock 14 is engaged between the lower edges of the walls 34a-34d and that its lower face 60a is aligned with these lower edges.

Figure 13:
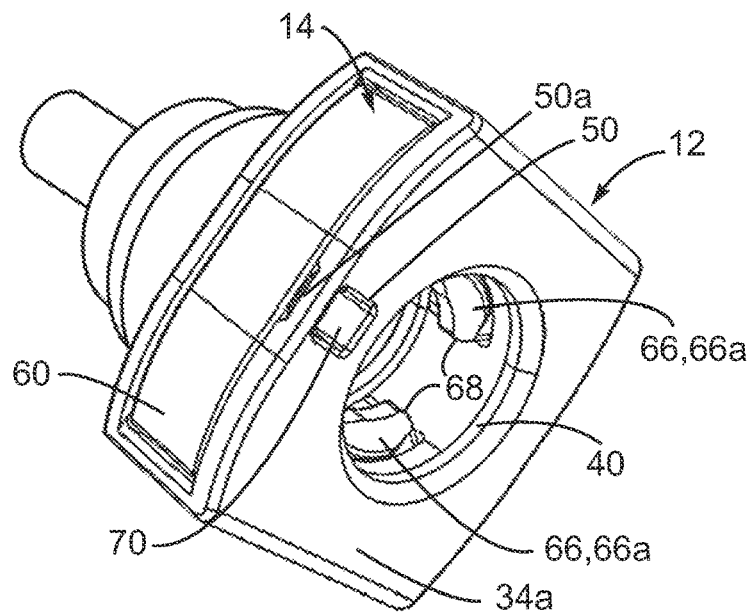
Figure 14:
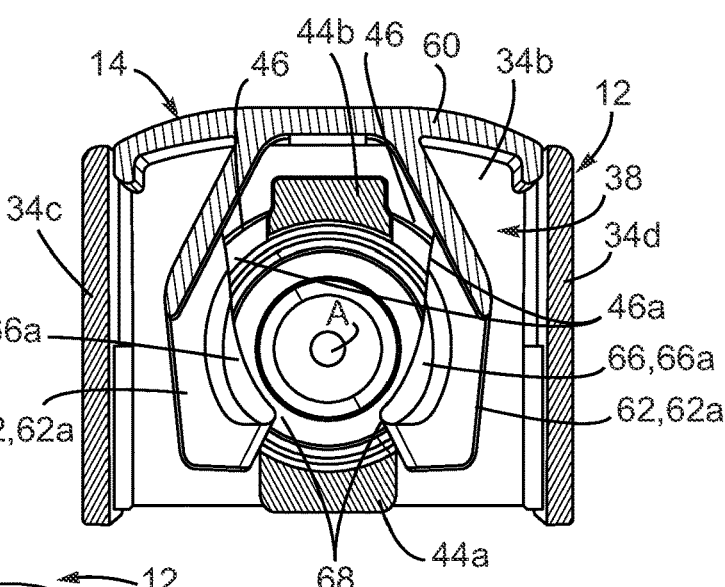

In this position, also represented in FIGS. 13 and 14, the lug 70 of the lock 14 is engaged in the orifice 50 of the female connector 12, which makes it possible to make the lock unlosable, opposite the female connector. During the insertion of the lock 14 in the cavity 38 of the connector 12, the legs 62 are engaged firstly in the cavity by passing on either side of the lower bridge 44b, up to the lug 70 bears onto the lower edge of the front wall 34a. This front wall 34a can comprise a notch 50a to the right of the orifice 50, to facilitate the passage of the lug 70 up to into this orifice 50. The elasticity of the parts, which are, for example, made of plastic material, is such that the engagement of the lug 70 in the orifice 50 is obtained by elastic snap-fitting, i.e. by an elastic deformation of the lug 70 during the passage of the hard point for bearing the lug 70 on the bottom of the notch 50a, and elastic return during the engagement of the lug 70 in the orifice 50.

In this position, the legs 62 are located on either side of the axis A and their teeth 68 are in the proximity of the upper bridge 44a and can bear onto this upper bridge 44a, as can be seen in FIG. 14. To reach this position, another elastic snap-fitting has been able to be necessary during the insertion of the lock 14 in the cavity, by carrying and sliding the teeth 68 over the lower bridge 44b to ensure the displacement of the legs 62 until the inter-tooth 68 distance is greater than or equal to the thickness of the bridge 44b.

FIG. 14 makes it possible to observe that, in this position, the circumferential bosses 66 of the legs 62 are centred on the axis A. FIG. 13 furthermore makes it possible to observe that the opening 40 of the front wall 34a has a diameter such that the bosses 66 are visible and accessible through this opening, for example such that, from the insertion of the male connector 22 in the female connector 12, its nozzle 24 cooperates with the bosses 66 by bearing onto its surfaces 66a to urge outwards and displace the legs 62.

Figure 15:
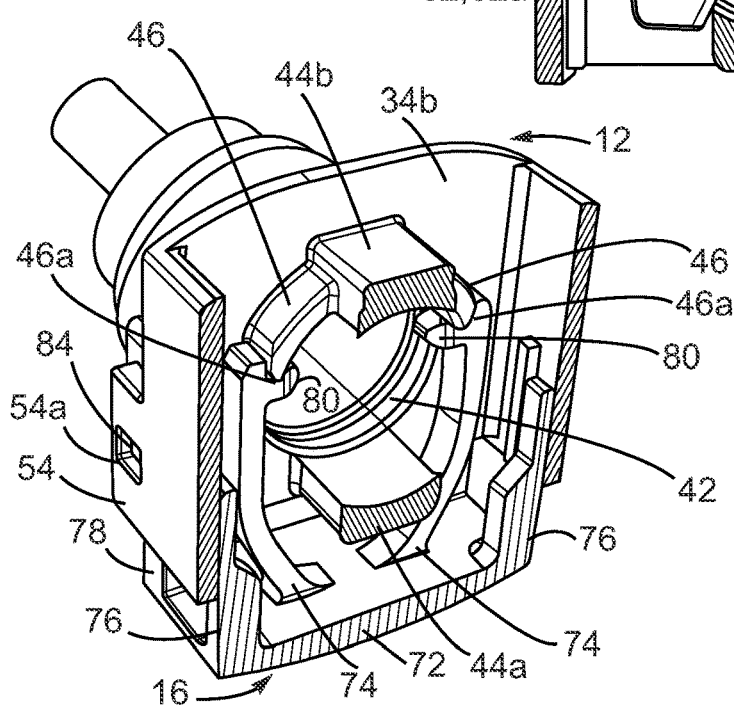
Figure 16:
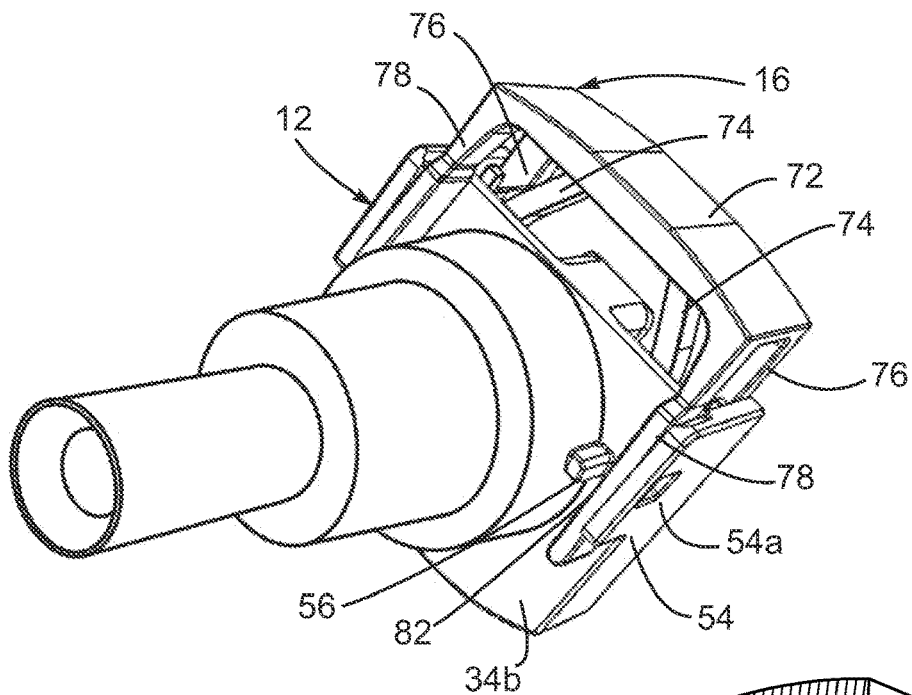

FIGS. 1, 15 and 16 furthermore show a first position for mounting the indicator 16 on the female connector 12, which is a position for releasing the lock 14.

In this position, the legs 74 and 76 of the indicator 16 are engaged in the cavity 38 of the female connector 12 and the legs 78 extend behind the rear wall 34b, by each being inserted between the abovementioned section of the line 36 and one of the legs 54. The cap 72 is also not engaged between the upper edges of the walls 34a-34d.

The legs 74 are located on either side of the axis A and their teeth 80 bear onto or are at a low distance from the edges 46a of the vanes 46. It can be observed in FIG. 15, that they protrude inwards and the inter-tooth distance is less than that diameter of the opening 42 of the rear wall 34b. The bridge 44a extends between the legs 74.

The legs 76 are engaged between the front wall 34a and the ridges 52. The ridges 52 thus define, with the front wall 34a, two tracks for guiding the legs 76 and therefore the indicator 16. In this position, only the portions 76a of the legs 76, even also a portion of the portions 76b, are engaged in the cavity 38.

During the mounting of the indicator 16, the legs 78 can cooperate by their front edges with the rear face of the rear wall 34b. The indicator 16 is moved in translation in a plane, perpendicular to the axis A, until the hooks 84 are engaged by elastic snap-fitting in the orifices 54a of the legs 54, on the one hand, and that the hooks 82 pass the hard points formed by the blocks 56, on the other hand.

As mentioned above and which can be seen in FIG. 16, the hooks 82, 84, on the one hand, and the orifices 54a and the blocks 56, on the other hand, are located in different planes. During the mounting of the indicator 16, the legs 78 are elastically deformed to each pass the "chicane" imposed by this plane offset. The legs 78 indeed undergo a first deformation inwards due to the hooks 84 which bear onto the legs 54, and undergo, in addition, a second deformation this time outwards, due to the hooks 82 which bear onto the blocks 56. In the mounted position, represented in the drawings, the hooks 84 are cooperated in the orifices 54a and the hooks 82 are located under the blocks 56. The indicator 16 is thus made unlosable in respect with the female connector 12.

Figure 17:
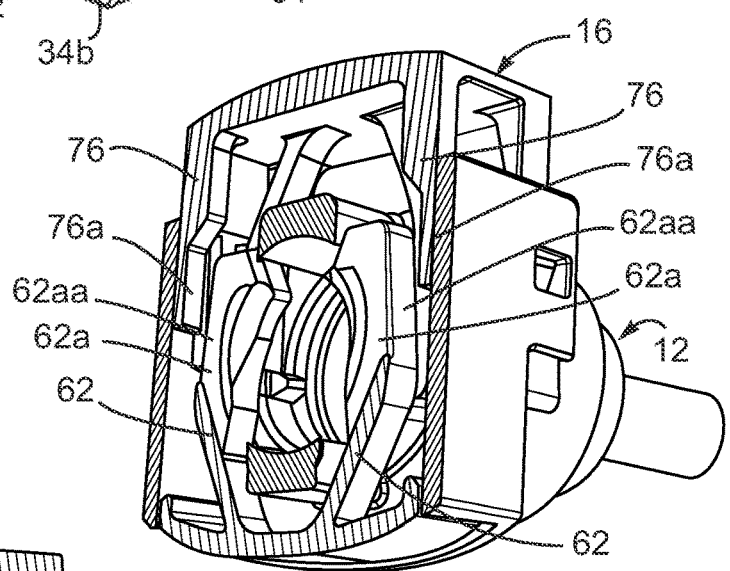
Figure 18:
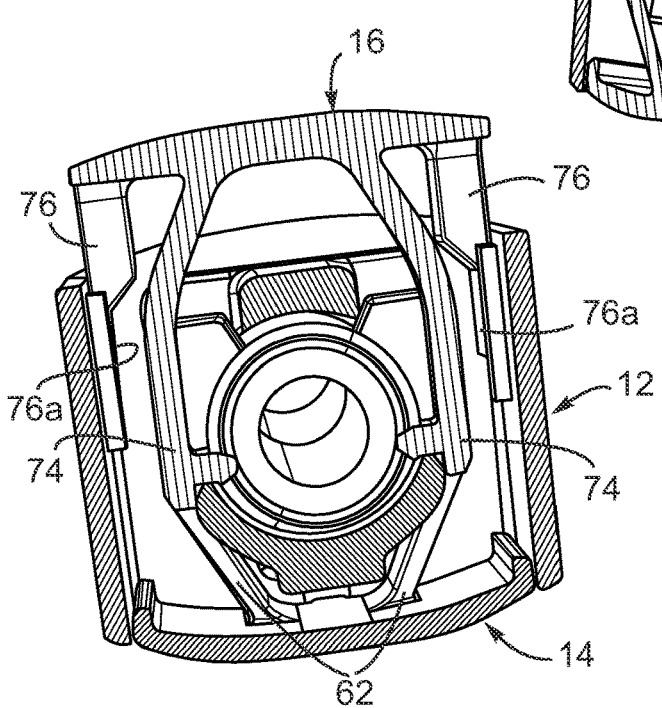

FIGS. 8, 17 and 18 represent the relative positions of the lock 14 and of the indicator 16, in the cavity 38 of the female connector 12, when the indicator 16 is in the abovementioned position for releasing the lock 14.

First, it is observed in FIG. 8, that the legs 62 of the lock 14 are configured to be substantially coplanar with the legs 76 of the indicator 16, in a plane, perpendicular to the axis A. The outer edges 62aa of their branches 62a are substantially facing the portions 76a of the legs 76. FIG. 17 shows the distance between the edges 62aa and the portions 76a which enables a displacement of the portions 62a and therefore of the legs 62 in this plane. It is thus understood that, when the indicator 16 is in this position, the legs 62 of the lock 14 can be displaced from one another.

Moreover, the legs 74 of the indicator 16 are arranged just behind the legs 62 of the lock 14, which can be seen in FIGS. 7, 8 and 20.

FIGS. 19 to 24 illustrate the relative positions of the lock 14 and of the indicator 16, in the cavity 38 of the female connector 12, when the indicator 16 is in the position for locking the lock 14.

The indicator 16 is brought into this position by exerting a force on the cap 72, in the direction of the axis A, until the cap is inserted between the upper edges of the walls 34a, 34c and 34d, the cap resting on the upper edge of the rear wall 34b in the example represented.

In this position, the hooks 84 of the legs 78 are located under the legs 54 and ensure a retaining of the indicator 16 in this position in respect with the female connector 12. It is subsequently understood, that the passage between the two positions of the indicator 16 has led to an elastic deformation of the legs 78, of which the hooks 84 have had to exit the orifices 54a of the legs 54, as well as an elastic snap-fitting of these hooks 84 under the legs 54.

Moreover, the legs 76 have slid more into the guiding tracks defined by the ridges 52 and have their portions of excess thickness 76b which are now substantially facing the outer edges 62aa of the legs 62 of the lock 14, to limit their displacement one from another.

Finally, the branches 74a of the legs 74 now extend on either side of the vanes 46 and their teeth 80 bear onto the lower edges of these vanes. In this position, the legs 74 are in the free state and can bear, through the inner edges of their branches 74a, on the vanes 46 or their edges 46a.

Figure 30:
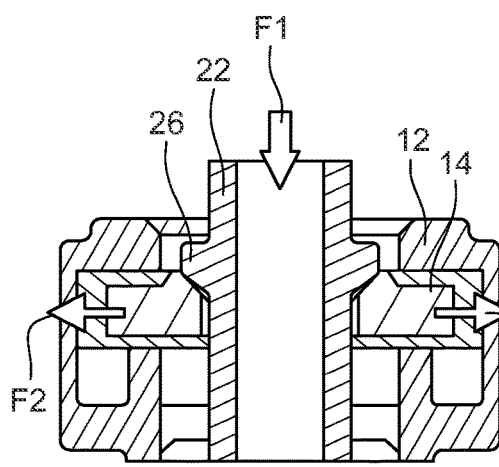
Figure 31:
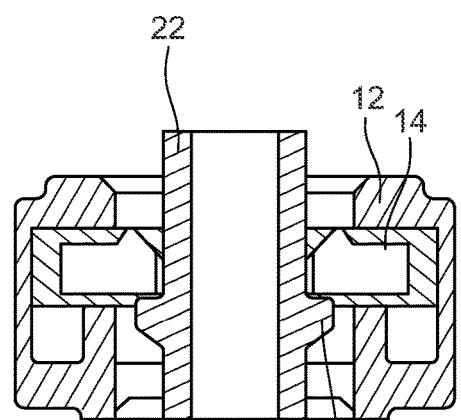

Now, FIGS. 30 and 31 are referred to, which illustrate steps of inserting the male connector 22 in the female connector 12.

Given the above, it is understood, that in the illustrated embodiment, this insertion is only possible when the indicator 16 is in the position for releasing the lock 14 represented in FIG. 1, for example.

The male connector 22 is inserted in the housing 30 of the female connector 12 by engaging the nozzle 24 in this housing until the ridge 26 of the nozzle 24 bears onto the surfaces 66a of the bosses 66 of the legs 62 of the lock 14. Just before that, the cylindrical surface 24a of the nozzle cooperates with the surface 57 of the ring 18 to centre and guide this insertion, then with the seals 20 to seal the connection.

An axial support on the male connector 22 (arrow F1) will cause a displacement of the legs 62 of the lock 14 (arrows F2), this displacement being enabled by the indicator 16 as mentioned above. The insertion of the male connector 22 is continued until the ridge 26 is located behind the legs 62 of the lock, which thus return, by elastic returning, their initial position (FIG. 31). In this position, although this cannot be seen, the ridge 26 bears radially onto the teeth 80 of the legs 74 of the indicator 16 and urges them outwards. The legs 74 are displaced from one another and no longer bear onto the edges 46a of the vanes 46. It is under this condition that the indicator 16 can be moved in translation from the position of FIG. 1 to the position of FIG. 19, wherein it locks the lock 14, as the legs 62 of the latter can no longer be sufficiently displaced from one another to be able to remove the male connector 22 from the female connector 12.

When functioning, the pressure of the fluid transferred in the device will generate an axial force extending the male connector 22 to exit from the female connector 12. This force will be translated by axially carrying the ridge 26 of the connector 22 on the rear faces of the branches 62 of the lock. These branches 62 will thus bear through their front faces extending around the bosses 66 on the peripheral edge of the opening 40 of the front wall 34a, inside the cavity 38, which will make it possible to immobilise the assembly and guarantee the connection.

Figure 32:
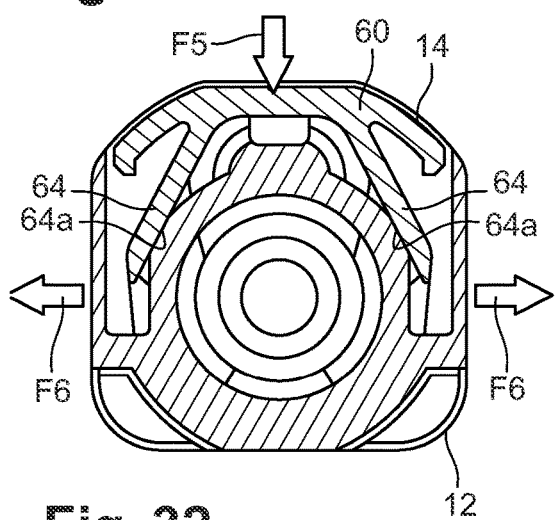
FIGS. 32 and 33 are schematic, cross-sectional views of the device of FIG. 1 and illustrate a step of unlocking the lock and removing the male connector from the female connector.
Figure 33:
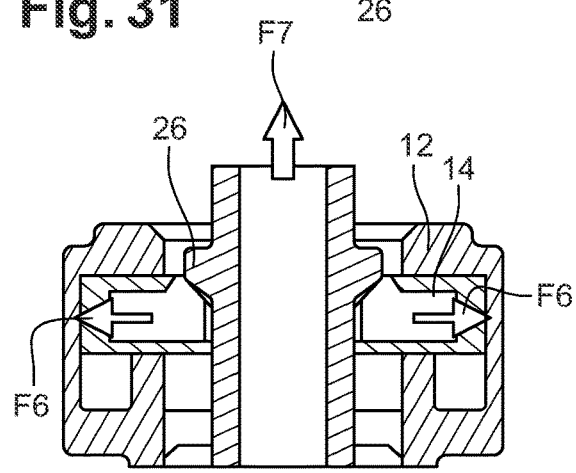

A dismounting of the device 10 is however possible, as represented in FIGS. 32 to 34. A first step includes removing the indicator 16 into its position for releasing the lock 14. This is schematically represented in FIG. 34 or side forces directed towards one another and applied on the portions 78a of the legs 78 are applied simultaneously (arrows F3). This makes it possible to extend the hooks 84 of the legs 54. A force according to the arrow F4 is thus be applied on the indicator 16 to bring it back into its position illustrated in FIG. 1. Thus, a support force may be applied on the cap 60 of the lock 14 (arrow F5) such that the ridges 64 of the legs 62 of the lock 14 bear and slide through their edges 64a on the edges 48b of the boss 48, which will cause a sufficient displacement of the legs 62 (arrow F6), such that the inter-tooth distance 68 is greater than or equal to the diameter of the ridge 26 of the male connector 22. The latter can thus be removed by axial translation frontwards (arrow F7).

The device according to the present disclosure can be used in all fluid transfer fields, for example low-pressure fluid transfers (less than or equal to 15 bars). The fluid transferred can be water, fuel, oil, a washer liquid, air, an SCR fluid, etc.

While illustrative embodiments have been illustrated and described, it will be appreciated that various changes can be made therein without departing from the spirit and scope of the present disclosure.

The embodiments of the invention in which an exclusive property or privilege is claimed are defined as follows:

1. A fluidic connection device for a fluid circuit, comprising:
   a female fluidic connector comprising a housing configured to receive a male fluidic connector by translation along an axis (A);
   a U-shaped lock carried by the female connector and comprising a pair of elastically deformable legs, the pair of elastically deformable legs being arranged substantially in a first plane, perpendicular to the axis (A) and on either side of the axis (A) and being configured to cooperate by elastic snap-fitting with the male connector to ensure retention of the male connector in the female connector along the axis (A); and
   a locking indicator carried by the female connector and configured to be moved in translation in a direction, perpendicular to the axis (A), between a first position for releasing the U-shaped lock and a second position for locking the U-shaped lock,
   wherein the locking indicator comprises a first pair of legs and a second pair of legs, the first pair of legs being separated from the second pair of legs, and the first pair of legs having an elastic deformation capacity by displacement from one another, which is different from an elastic deformation capacity of the second pair of legs,
   wherein the first pair of legs are configured to cooperate by elastic deformation with the male connector, from a first substantially free position without constraint, wherein the first pair of legs cooperate with the female connector to forbid a translation of the locking indicator in said direction, up to a constrained position, wherein the locking indicator is configured to be moved in translation in said direction,
   wherein the second pair of legs are configured to cooperate by abutting with the U-shaped lock to limit their displacement, when the locking indicator is in the second position.

2. The fluidic connection device according to claim 1, wherein the locking indicator comprises a third pair of legs which are separated from the first pair of legs and the second pair of legs, and which have an elastic deformation capacity by displacing one from the other, the elastic deformation capacity of the third pair of legs being different from the elastic deformation capacity of at least one of the first pair of legs or the second pair of legs, the third pair of legs being configured to cooperate by elastic snap-fitting with the female connector to retain the locking indicator opposite the female connector in translation in said direction.

3. The fluidic connection device according to claim 2, wherein the third pair of legs comprises hooks oriented inwards with respect to the axis (A), and hooks oriented outwards with respect to the axis (A).

4. The fluidic connection device according to claim 3, wherein the female connector comprises a connection interface comprising the housing and connected to a connecting line extending from one side of the interface along the axis (A), the connecting line comprising a cylindrical portion comprising first fastening members oriented outwards with respect to the axis (A) and configured to cooperate with the hooks oriented inwards, and the connection interface comprises two legs facing the first fastening members and comprising second fastening members configured to cooperate with the hooks oriented outwards.

5. The fluidic connection device according to claim 4, wherein the first fastening members are located in a second plane parallel to the axis (A), and the second fastening members are located in a third plane parallel to the second plane and further away from the axis (A) than it is from the second plane.

6. The fluidic connection device according to claim 2, wherein the third pair of legs is configured to undergo a double flexion, respectively inwards and outwards, with respect to the axis (A), during passage of the locking indicator between the first position and the second position, and during passage of the locking indicator between the second position and the first position.

7. The fluidic connection device according to claim 1, wherein the first pair of legs and the second pair of legs extend into planes parallel and offset from one another.

8. The fluidic connection device according to claim 2,
wherein the first pair of legs and the second pair of legs are parallel and offset from one another, and
wherein the first pair of legs is located between the second pair of legs and the third pair of legs.

9. The fluidic connection device according to claim 8, wherein the third pair of legs are aligned axially with the second pair of legs.

10. The fluidic connection device according to claim 1, wherein the second pair of legs comprises first free portions displaced from one another by a distance L2 and connected to the cap by second portions displaced from one another by a distance L1, which is less than L2, the first pair of legs and the second pair of legs being configured to be opposite the first free portions when the locking indicator is in the first position, and to be opposite the second portions when the locking indicator is in the second position.

11. The fluidic connection device according to claim 1, wherein the legs of the second pair are configured to each be sandwiched between one of the legs of the U-shaped lock and a side wall of the female connector.

12. The fluidic connection device according to claim 1, wherein the first pair of legs and the second pair of legs are connected to a closing cap of a cavity of the female connector.

13. The fluidic connection device according to claim 12, wherein the cap has a flat and parallelepiped shape, and the second pair of legs and a third pair of legs of the locking indicator are connected respectively to four corners of the cap.

14. The fluidic connection device according to claim 13, wherein the first pair of legs is connected substantially to a middle of the cap.

15. The fluidic connection device according to claim 1, wherein the female connector comprises a wall comprising a passage opening of the male connector, the legs of the locking indicator being configured to bear onto an excess thickness of the wall which forms an annular boss around the passage opening.

16. The fluidic connection device according to claim 1, wherein the locking indicator comprises a protruding lug configured to cooperate by force or by elastic deformation in an orifice of the female connector.

17. A fluidic connection device for a fluid circuit, comprising:
a female fluidic connector comprising a housing configured to receive a male fluidic connector by translation along an axis (A);
a U-shaped lock carried by the female connector and comprising a pair of elastically deformable legs, the pair of elastically deformable legs being arranged substantially in a first plane, perpendicular to the axis (A) and on either side of the axis (A) and being configured to cooperate by elastic snap-fitting with the male connector to ensure retention of the male connector in the female connector along the axis (A); and
a locking indicator carried by the female connector and configured to be moved in translation in a direction, perpendicular to the axis (A), between a first position for releasing the U-shaped lock and a second position for locking the U-shaped lock,
wherein the locking indicator comprises a first pair of legs and a second pair of legs, the first pair of legs being separated from the second pair of legs, and the first pair of legs having an elastic deformation capacity by displacement from one another, which is different from an elastic deformation capacity of the second pair of legs,
wherein the first pair of legs are configured to cooperate by elastic deformation with the male connector, from a first substantially free position without constraint, wherein the first pair of legs cooperate with the female connector to forbid a translation of the locking indicator in said direction, up to a constrained position, wherein the locking indicator is configured to be moved in translation in said direction,
wherein the second pair of legs are configured to cooperate by abutting with the U-shaped lock to limit their displacement, when the locking indicator is in the second position,
and wherein the locking indicator comprises a third pair of legs which are separated from the first pair of legs and the second pair of legs, and which have an elastic deformation capacity by displacing one from the other, the elastic deformation capacity of the third pair of legs being different from the elastic deformation capacity of at least one of the first pair of legs or the second pair of legs, the third pair of legs being configured to cooperate by elastic snap-fitting with the female connector to retain the locking indicator opposite the female connector in translation in said direction.

* * * * *